United States Patent Office 3,474,722
Patented Oct. 28, 1969

3,474,722
CORN DEGERMINATION PROCESS
Stanley A. Watson, La Grange Park, Ill., and Charles W. Stewart, Waverly, Ohio, assignors to Corn Products Company, New York, N.Y., a corporation of Delaware
No Drawing. Filed Dec. 23, 1966, Ser. No. 604,179
Int. Cl. A23l 1/10
U.S. Cl. 99—80                                   12 Claims

ABSTRACT OF THE DISCLOSURE

Degerminating corn kernels by steeping the kernels in an aqueous solution to increase the moisture content to at least 37%, compressing the hydrated kernels perpendicular to the plane of their broad surfaces with pressure sufficient to release the germ portion but insufficient to cause breakage of the germ and then separating the germ from the kernels.

---

The present invention relates to an improved method of degerminating corn kernels. More specifically, the instant invention is concerned with degerminating corn kernels by first steeping the kernels in an aqueous solution until the kernels have a moisture content of at least 37%. The steeping step is then followed by a germ release step. The escape of germ from remainder of the constituents of the corn kernels is effected by compressing the hydrated kernels perpendicular to the plane of their broad surfaces with a pressure sufficient to release the germ portion but insufficient to cause breakage of the germs. The germs are then separated in some manner from the degerminated kernels.

A typical corn kernel consists of about 80% endosperm which contains essentially all of the starch in the kernel, about 12% germ consisting of embryo and scutellum which contains about 85% of the total kernel oil or all of the easily recoverable oil, and a thin cellulosic covering called the pericarp or hull. The germ is in firm ligation with endosperm through means of a layer of an amorphous protein-carbohydrate mixture. This cementing layer holds the germ firmly to the endosperm by penetrating grooves on the surface of the scutellum, and causes difficult separation of the germ from endosperm.

Conventionally, degermination of corn is usually carried out by steeping the kernels for relatively long periods of time in sulfurous acid, that is, an aqueous solution of sulfur dioxide. This process, known as wet milling, is essentially concluded by releasing the germ from the remainder of the kernel by attrition in an appropriate mill. Such mills usually include rotating knobs or teeth which tear apart the steeped kernel. In the wet mill process, the kernel must be steeped for a time ranging from about 30 to about 50 hours to effect clean germ separation. Insufficient steeping causes a great proportion of germs to become shattered in the attrition mill. However, if the kernel is steeped for an appropriate amount of time, satisfactory germ release is obtained in the process. That is, during the prolonged steeping, the internal structures connecting the germ and adjacent endosperm are so weakened that endosperm is essentially brushed away from the germ surface during milling.

The prolonged but necessary steeping of corn as an initial step in the wet milling procedure presents a number of serious drawbacks. For example, such extended soaking period generally requires large inventories of grain and water, and necessarily requires extremely large storage bins which take up much valuable plant space. This in turn does not allow one to efficiently process a number of different varieties of corn as needed over short periods of time. Again, it has been noted that the long steep time tends to gradually extract from the germ structure a number of useful substances such as minerals, proteins, sugars, vitamins, etc. The useful materials must be subsequently recovered in a separate step, which again makes the overall process less attractive economically. Also, the prolonged steeping tends somewhat to contribute a distasteful flavor and aroma to the germ. Furthermore, germ from corn steeped over a relatively long interval of time becomes essentially coid of indigenous antioxidants and rapidly becomes rancid when stored dry at room temperature for any extended period.

Another proposed process is steeping the corn in a dilute base such as sodium hydroxide. In addition to just advanced drawbacks of long duration soaking, this method presents other possible detriments. Specifically, with a prolonged soak in alkaline solution, it has been noted that in addition to loss of valuable products through extraction, spoilage and putrefaction may tend to more readily take place.

It would therefore become a distinct advance in the art of degerminating corn if a method were found which would include a relatively short steeping step. This would avoid the disadvantages just discussed above. Moreover, if this steeping step could be linked with a subsequent germ release step, whereby the germ was quickly and efficiently separated from the remainder of the kernel without resort to intricate special equipment, such process would find ready acceptance. Lastly, if the discovered method resulted in separated germ component which yielded oil of a character at least equal to or even superior to that realized from conventional methods, such overall degermination process would be exceedingly attractive.

It therefore becomes an object of the invention to provide an improved method of degerminating corn.

A more specific object of the invention is to degerminate corn by utilizing in the overall process a steeping step of relatively short duration.

Yet another object of the invention is to provide a degermination process having the above discussed advantage of short steep time, which in addition yields germs of quality at least equal to those realized from conventional degermination techniques.

An additional object of the invention is to provide a germ release step which allows facile separation of the germ component from the other corn kernel constituents.

Other objects will appear hereinafter.

In accordance with the invention, an improved method of degerminating corn kernels has been discovered. This process broadly comprises the steps of steeping corn kernels in an aqueous solution for a time at least sufficient to impart to the kernels a moisture content of at least 37%. The hydrated kernels are then compressed perpendicular to the plane of their broad surfaces with a pressure sufficient to release the germ portion from the kernels but insufficient to cause breakage of the germs. The germs are then separated from the degerminated kernel portion by conventional techniques.

The first step in the process of the invention involves steeping the kernels until they have a moisture content of at least 37%. While the lower limit of moisture content appears to be of critical importance, such does not appear to be the case with respect to the upper limit. Such upper limit is generally dictated by fact of maximum moisture able to be retained by the corn kernel. Generally, maximum achievable moisture content in most corn species susceptible to hydration appears to be in the range of about 55%. The percent moisture expressed is in the terms of weight percent and is based on total weight of water and corn composition.

The steep or soak step may be accomplished by immersion in water alone without resort to addition of base or acid substances. Again, the steeping step may be effected either at room temperature or at elevated temperatures. Preferably, the soaking is carried out at a temperature ranging from about room temperature to about 60° C. and most preferably at 40–60° C. for a period of time ranging from about 3 to about 6 hours.

In a greatly preferred embodiment, the steep water utilized is basic in character. It has been discovered that the proper moisture content may be achieved in materially less time when a basic aqueous soak medium is utilized. With such process modification, the steeping time may be lowered to about ½ hour, and generally is carried out from about ½ to about 3 hours duration. Any basic reagent may be employed such as dilute aqueous solutions of sodium hydroxide, potassium hydroxide, ammonium hydroxide, etc. Due to availability and favorable cost, sodium hydroxide solutions are preferred. For best results, the alkaline steep solution should be about 0.01 to about 1.0 normal in strength. More preferred alkaline solutions range from about 0.3 N to about 0.1 N. The pH of the soak solution likewise should be from about 9 to about 12, and preferably falls within the range of 10–11.

It is believed that the short soaking step does not materially affect the cement layer linking the endosperm and germ portions of the corn kernel. It is further thought that the germ-endosperm linking layer through only limited water or aqueous base penetration is put in such condition as to allow better slippage of endosperm down the sides of the germ upon subsequent application of pressure to the kernel. That is, while there is interaction of water or alkalized water with internal hull layers, there is only limited penetration into both the layer that cements germ to endosperm and the hyaline layer cementing tip caps to germ.

The next step in the invention involves subjecting the hydrated kernels to a pressure source of the type generally described above. This step may be accomplished by exerting pressure of the type described by means of suitable apparatus now available. Any mechanical operation may be utilized which obtains clean separation of germ from endosperm. The surfaces contacting the broad side of the kernels in pressure relationship may be composed of any rigid or partially elastic material. Pressure is applied which is just sufficient to rupture the endosperm and flatten the kernel to a thickness about equal to the thickness of the germ itself. When pressure is properly applied, the germ no longer adheres to the endosperm and can be easily removed, free of endosperm and pericarp.

The following has been presented by way of explanation of phenomenon of germ release as carried out in the instant invention. Such explanation is only intended as a theory as to what is believed to occur, and the invention is not to be limited thereto. It is believed that compression of the hydrated kernel perpendicular to its broad surfaces causes the endosperm to flow laterally. This movement results in a shearing action along the sloping face of the germ, which action ruptures the cementing layer and thus frees the germ from the endosperm. In the properly hydrated condition, the germ is somewhat rubbery in texture and will not fracture if the movement of the pressure on each side of the broad surface is stopped when the distance is about equal to the thickness of the germ. If moisture content is too low, for example in the range of 18–22% moisture which is considered optimum for dry corn milling, application of pressure results in shattering of both endosperm and germ with little germ release.

While the following discussion of degermination is made with respect to subjecting the kernels to pressure rollers, such explanation is merely meant to be illustrative of this step. Other modes of degermination may also be practiced, such as, for example, crushing the soaked kernels by means of a press etc.

In the preferred practice of the invention, the soaked corn kernels are degerminated by passing them between a pair of counter-rotating cylinders of rigid, semi-rigid or elastic material. In one embodiment, a pair of smooth steel rolls is utilized which are set for a gap at the nip to apply pressure to both largest and smallest kernels being processed is utilized. Water soaked corn kernels generally vary in thickness from 0.15 to 0.50 inch, and more often from about 0.095 to about 0.125 inch and gaps of comparable distance should be set. Thus a typical roller mill apparatus utilized in the instant invention may be designed so that the distance between the rolls is not rigidly set, but is allowed to increase or decrease depending upon the size of the kernels passing between the rolls. This may be achieved by utilization of relatively weak tension springs whereby the gap is automatically adjusted when contacting kernels of varying sizes and germ release is obtained with minimal germ damage. The water-soaked corn kernels, when fed into the nip between the rolls, orient themselves with the broad sides against the roll surface and are crushed to the required degree as they are pulled between the cylinders.

The roller mills themselves may be operated whereby the roll surfaces are smooth or roughened. Again, the opposing rolls may be rotated at different or the same speeds. It is preferred to utilize rolls presented a smooth face which are operating at the same peripheral speed.

It should be emphasized that the method of the invention can be carried out with or without a separate step of hull or pericarp removal prior to compression. When the degermination step is practiced upon intact kernels, the hull is usually split lengthwise in several places under pressure and thereby loosened from the face of the germ of the kernels. The hull can then be separated from germ and endosperm by a variety of techniques.

In another modification of the invention subsequent to the compression step the crushed kernels are treated to completely free germ and endosperm from adhering pieces of hull and tip cap. This may be accomplished by any conventional dehulling process as generally described above. For example, the crushed kernels may be immersed in water and gently agitated in suspension for several minutes. The lighter hulls and tip caps will generally float to the top of the suspension, and can be removed simply by skimming them off the top. The heavier components are then taken off the bottom of the vessel.

All that remains in the process is to completely separate the germs from other kernel components and particularly endosperm. Again, this may be accomplished in a wide variety of ways. For example, one may take advantage of fact of lower density of the germs resulting from their higher oil content which causes them to be selectively floated on a number of media. One conventional technique is to utilize a starch slurry of about 10 to 20 Baumé. The crushed kernels are added to the starch, the lighter germ floats to the top and is easily and conveniently removed from other corn components such as by skimming the germ off the top of the slurry.

It should be noted at this time that a number of other chemicals were added to the steep water as potential adminicles to accelerate rate of water adsorption. As described above, while small amounts of base did cause the corn kernels to absorb water at about double the rate of untreated water, conventional steep additives such as sulfur dioxide and lactic acid surprisingly did not cause the same accelerating effect. Moreover, the alkali treatment improved dehulling of the kernels upon passage between the crushing rolls, and as well as improved germ release from tip caps and reduced germ breakage. The use of base apparently loosens the hulls to a sufficient degree to allow them to be removed from the kernels upon passage between the rolls in the germ-release step.

It has been found that the germ released in the above described process is more stable to fatty oxidation and yields oils of improved flavor, color and refining characteristics. Other advantages of the process also are quite apparent. For example, less operational space is required for an equivalent grind rate, and capital expenditure for steeping equipment is considerably less. In addition, a measurably less amount of germ solubles are released to the steep water which must be concentrated. Lastly, due to the versatility of the process, one need maintain only small corn inventories, which also permits complete cessation of steeping activities during plant shut down.

The following examples illustrate the various facets of the invention. It should be understood, however, that these examples are merely meant to be illustrative and the invention is not to be limited thereto.

EXAMPLE I

Two batches of whole yellow dent corn were soaked in water for 4 and 16 hours. The water was decanted and the swollen kernels were separated into several classes of thickness. Each group was placed separately between the plates of a press and the plates were brought into contact with the broad kernel surfaces. Thereupon just enough pressure was applied to cause limited flattening of the kernels. Upon examination, the germs appear free and could be easily separated from the endosperm by hand. The bulk of the germs were relatively intact. When the same test treatment was applied to dry corn kernels (10–25% moisture), fracturing of both germ and endosperm occurred with little evidence of germ separation.

The water steeped kernels were also passed between the nip of a roller mill equipped with smooth steel rolls which turned in opposite directions at the same number of revolutions per minute. The rolls could also be somewhat roughened to facilitate kernel passage without altering the desired effective degermination. When set at the appropriate gap, suitable degermination was noted with both the 4 and 16 hours steeped corn.

EXAMPLE II

Samples of seed corn, graded according to thickness, were steeped in tap water for 4 hours at 60° C. and passed through a roller mill at appropriate settings. One batch designated as medium flat grade (0.20 inch to 0.30 inch thickness) showed best germ release at a roller gap setting of 0.100 inch, while a second lot designated as medium round (0.30 inch to 0.45 inch) showed best germ release at a roll gap setting at 0.125 inch.

EXAMPLE III

Whole corn kernels were steeped 4 hours in tap water at 60° C. The water was then drained off and the partially softened kernels passed between counter-rotating rolls of a roller mill. The 6-inch diameter smooth steel rolls were adjusted to a clearance of 0.100 inch at the nip. The kernels emerged flattened with the germs loosened. 200 grams (110 grams dry substance) of the crushed kernels were mixed in 200 ml. water for one minute in a blender. The starch was washed out on a 80-mesh screen, the tailings suspended in a 14° Baumé salt solution and germs recovered by skimming. The underflow was reground and the remaining germs skimmed off the salt solution. Whole and broken germs were obtained in good yield and relatively free of hulls and endosperms as indicated by the data in Table I below. As is evident from the data below, the low oil content and high starch content of the plus 80-mesh fraction (hulls and endosperms) give evidence of the completeness of germ removal.

TABLE I.—FRACTIONATION OF ROLLER MILLED CORN

| Fraction | Dry Weight, grams | Oil Content, percent | Starch Content, percent |
|---|---|---|---|
| Whole Corn | 200 | 4.97 | 72.8 |
| Germ | 33.4 | 31.8 | 18.1 |
| −80 Mesh | 18.0 | 0.4 | 97.3 |
| +80 Mesh | 146 | 0.73 | 77.4 |

EXAMPLE IV

An ungraded sample of corn was first steeped in tap water for 4 hours at 60° C. The hydrated corn was then passed between rolls set first at 0.125 inch and immediately passed between a second roller mill set at 0.100 inch. The crushed corn was placed in a blender equipped with rubber covered blades and agitated with water for one minute. The blender charge was dewatered and placed in a 9° Baumé starch slurry and the germs thereafter skimmed off. From a 189 grams (dry basis) of crushed corn kernels (4.5% fat) was recovered 20.6 grams (dry basis) germs analyzing 34.5% fat. Recovery of the oil was 78%.

EXAMPLE V

Medium flat corn kernels were steeped for various periods of time in tap water at 60° C. until varying degrees of moisture content were achieved. The samples were then passed between rolls of a mill set at 0.110 inch and the germ separated. Two batches having moisture contents of 38 and 40% respectively showed good separation of germ which remained largely intact after the pressure step. Two other lots having moisture contents of 25.6 and 31.9 after subjection to the roller mill were not effectively processed in this step. Specifically, the germ was crushed to a substantial degree and incomplete separation of germ from other components of kernel was noted.

EXAMPLE VI

A number of chemical reagents were added to the steep water in order to see if dehulling could be facilitated during the germ release step. It was discovered that substances like sodium hydroxide, calcium hydroxide and ammonium hydroxide when added to water in varying amounts, materially increased dehulling during the germ release step. In some instances, complete dehulling took place during this step, obviating a separate time consuming dehulling step. On the other hand, addition of sulfur dioxide or lactic acid in no way aided in dehulling during the pressure application operation.

EXAMPLE VII

A lot of yellow dent corn, grade medium-flat, weighing 400 grams (analysis; 11.1% moisture, 4.7% fat, 70.7% starch and 10.4% protein) was steeped in 500 ml. of tap water at 60° C. for 4 hours. The corn was drained and passed through a roller mill set at a gap of 0.100 inch. The crushed grain from each lot was divided into four 250-ml. portions and milled 1½ minutes with 250 ml. water in a blender equipped with rubber covered blades. The blender discharge was washed on a nylon bolting cloth to remove free starch. The washed meal was then suspended in a 9° Baumé starch slurry prepared from a commercial starch and the germ floated and skimmed off. The germ and endosperm were then washed free of added starch which was then discarded. The germ amounted to 31.9 grams and analyzed 35.1% fat on a dry basis. The endosperm-hull fraction amounted to 283.1 grams and analyzed 79.6% starch, 0.83% fat and 8.6% protein, all on a dry basis.

EXAMPLE VIII

A lot of ungraded yellow dent corn weighing 452 grams (analysis; 12.3% moisture, 5.3% dry basis fat, 70.2% dry basis starch, and 10.8% dry basis protein) was steeped in 750 ml. tap water for 4 hours at 140° F. The corn was drained and passed through a roller mill set at a gap of 0.125 inch. It was then repassed through the mill now set at a gap of 0.100 inch. A 250 ml. portion of the crushed corn and 250 ml. water were placed in a blender equipped with rubber covered blades and blended for 90 seconds to free any germs still attached to hulls. Any starch that had been freed by the operation was washed off the grain on a silk bolting cloth attached to a shaker. The shaker tailings were then suspended in a 14° Baumé starch suspension prepared from commercial corn starch. The germs that floated were skimmed, washed, dried and analyzed for dry substance of fat. The germ separator underflow was washed to recover added starch which was dried and weighed. Any small increase in weight of this fraction was credited to endosperm recovery. The endosperm-hull fraction was analyzed to determine oil, starch and protein content. Results appear below in Table II. Unaccounted dry substance was the result of regular mechanical losses and sampling errors and is assumed to be uniformly distributed among all fractions.

TABLE II

| Fraction | Dry Weight, grams | Composition, percent d.b. | | | |
|---|---|---|---|---|---|
| | | Starch | Protein | Fat | Crude Fiber |
| Solubles | 14.3 | | 20.6 | | |
| Free Starch | 89.3 | 95.3 | 4.1 | 0.6 | |
| Germ | 41.7 | 8.8 | 15.8 | 33.0 | 27.8 |
| Endosperm-hull | 198.2 | 76.3 | 10.4 | 0.76 | 2.6 |
| Unaccounted | 39.0 | | | | |

EXAMPLE IX

This example illustrates the versatility of the invention in demonstrating that dehulling may be accomplished at any stage of the operation prior to degermination. In this run, the dehulling was carried out prior to the steep step.

A 425-gram lot of the corn described in Example VII was covered with 500 ml. of a 0.5% solution of sodium hydroxide at 49° C. and maintained at that temperature for 30 minutes. The grain was drained and rinsed with 300-ml. portions of water. Dehulling was accomplished by agitating the grain in a blender having rubber covered blades. A number of approximately 250-ml. lots of the alkali treated corn were blended with 250-ml. water for 2 minutes. When blending was stopped, the pericarps floated to the surface and were skimmed off, washed and dried. The dehulled corn was then steeped 2 hours in 750-ml. water at 60° C., drained and passed through a roller mill first set at 0.125 inch for the first pass and 0.000 inch for the second pass. The crushed grain was blended with water in a rubber bladed blender for 90 seconds. After blending, the grain was washed in a nylon bolting cloth affixed to a shaker for recovery of free starch. The germs were then floated, as previously described, on a 14° Baumé starch slurry. The added starch was washed from the endosperm fraction, rewashed on a filter, dried and weighed. Fraction weights and their compositions were as follows in Table III.

TABLE III

| Fraction | Dry Weight, grams | Composition, percent d.b. | | | |
|---|---|---|---|---|---|
| | | Starch | Protein | Fat | Crude Fiber |
| Hull | 20.1 | 5.3 | 1.5 | 1.2 | 28.8 |
| Dehulling Fines | 3.6 | 66.0 | 4.7 | 0.6 | |
| Solubles | 20.6 | | 12.4 | | |
| Free Starch | 62.1 | 94.2 | 4.6 | 1.2 | |
| Germ | 37.5 | 8.6 | 17.6 | 37.0 | 30.7 |
| Endosperm | 215.7 | 84.1 | 11.1 | 0.65 | 1.2 |
| Unaccounted | 12.9 | | | | |

As can be seen from the above example, prior removal of hulls by alkali treatment reduces steeping time required to prepare dehulled kernels for the germ pressure-release operation. Recovered germ was of better quality than germ obtained from non-dehulled kernels in that very few of the gems were broken, and contamination with hull and tip caps was essentially nil. Separation of the germs from endosperm by flotation in starch was much easier without presence of hulls.

The invention is applicable to degermination of a wide variety of corn specimens such as waxy corn, high amylose content corn, high oil content corn, high lysine corn, white corn, etc.

It will be apparent that many modifications and variations may be effected without departing from the scope of the novel concepts of the present invention.

The invention is hereby claimed as follows:

1. An improved method of degerminating corn kernels which comprises the steps of steeping said kernels in aqueous solution for a time at least sufficient to impart to said kernels a moisture content of at least 37%, compressing said hydrated kernels perpendicular to the plane of their broad surfaces with pressure sufficient to release the germ portion from said kernels but insufficient to cause breakage of said germs, and separating said germs from the degerminated kernels.

2. The method of claim 1 wherein prior to said compression step said kernels are dehulled.

3. The method of claim 1 wherein said steeping step is carried out at a temperature ranging from about 40° C. to about 60° C. for a period of time ranging from about ½ to about 6 hours whereby said kernels are hydrated to a moisture content ranging from about 37% to about 55%.

4. The method of claim 1 wherein said aqueous solution is a dilute aqueous base.

5. The method of claim 1 wherein said hydrated kernels are compressed between at least one pair of rolls.

6. The method of claim 5 wherein said hydrated kernels are compressed between at least two pairs of rolls having progressively decreasing gap distances.

7. The method of claim 6 wherein said rolls present smooth surfaces and each of said rolls is rotating at the same peripheral speed.

8. An improved method of degerminating corn kernels which comprises the steps of steeping said kernels in a 0.01–1.0 N aqueous base solution for a period of time ranging from about ½ to about 3 hours, at a temperature ranging from about 40° C. to about 60° C. wherein said kernels are hydrated to a moisture content ranging from about 37% to about 55%, compressing said hydrated kernels perpendicular to the plane of their broad surfaces with a pressure sufficient to release the germ portion from said kernels but insufficient to cause breakage of said germs, and separating said germs from the degerminated kernels.

9. The method of claim 8 wherein prior to said compression step said kernels are dehulled.

10. The method of claim 8 wherein said hydrated kernels are compressed between at least one pair of rolls.

11. The method of claim 10 wherein said hydrated kernels are compressed between at least two pairs of rolls having progressively decreasing gap distances.

12. The method of claim 11 wherein each of said rolls presents a smooth surface and is rotating at the same peripheral speed.

References Cited

UNITED STATES PATENTS 2,347,215   4/1944   Pattee.
2,670,290   2/1954   Hanser.

LIONEL M. SHAPIRO, Primary Examiner

J. R. HOFFMAN, Assistant Examiner

U.S. Cl. X.R.

146—221.8